United States Patent [19]

Ninomiya et al.

[11] Patent Number: 5,144,485
[45] Date of Patent: Sep. 1, 1992

[54] LENS HAVING A SURFACE TREATING COMPOSITION FOR REFLECTION PREVENTING FILM

[75] Inventors: Shinji Ninomiya; Kazuhiro Naganuma, both of Tokyo, Japan

[73] Assignee: Asahi Kogaku Kogyo K.K., Tokyo, Japan

[21] Appl. No.: 602,899

[22] Filed: Oct. 23, 1990

Related U.S. Application Data

[62] Division of Ser. No. 260,227, Oct. 20, 1988, abandoned.

Foreign Application Priority Data

Oct. 20, 1987 [JP] Japan .................. 62-264987
Sep. 5, 1988 [JP] Japan .................. 63-221566

[51] Int. Cl.⁵ .................. G02B 1/10; C08L 83/04
[52] U.S. Cl. .................. 359/580; 359/642; 524/860; 528/26; 528/38
[58] Field of Search .................. 359/642, 580; 528/38, 528/26; 524/860, 888

[56] References Cited

U.S. PATENT DOCUMENTS

| | | | |
|---|---|---|---|
| 3,524,900 | 8/1970 | Gibbon | 524/860 |
| 4,427,815 | 1/1984 | Ona et al. | 524/315 |
| 4,459,382 | 7/1984 | Ona et al. | 524/860 |
| 4,617,340 | 10/1986 | Tanaka et al. | 524/588 |
| 4,631,207 | 12/1986 | Price | 427/387 |
| 4,645,688 | 2/1987 | Makino et al. | 427/82 |
| 4,785,067 | 11/1988 | Brumbill | 528/26 |

FOREIGN PATENT DOCUMENTS 62-80603   4/1987 Japan .
62-178902  8/1987 Japan .

*Primary Examiner*—Scott J. Sugarman
*Attorney, Agent, or Firm*—Sughrue, Mion, Zinn, Macpeak & Seas

[57] ABSTRACT

A surface treating composition for a reflection preventing film comprising at least one surface treating agent selected from the group consisting of a reactive organic polysiloxane compound containing an amino group and a reactive organic polysiloxane compound containing an epoxy group, and a method for treating a reflection preventing film using such a surface treating composition.

7 Claims, No Drawings

LENS HAVING A SURFACE TREATING COMPOSITION FOR REFLECTION PREVENTING FILM

This is a divisional of application Ser. No. 07/260,277 filed Oct. 20, 1988 now abandoned.

FIELD OF THE INVENTION

The present invention relates to optical parts, such as lenses for glasses or cameras, filters for cameras or CRT's, or the like, which have a reflection preventing film. In particular, the reflection preventing film treated in accordance with the present invention is excellent in water resistance, contamination resistance, abrasion resistance, working resistance, etc.

BACKGROUND OF THE INVENTION

When an optical base material such as a glass lens or a plastic lens is directly used, reflection and glittering of the surface often harmfully affects the optical performance. Generally, the optical base material such as a glass lens or a plastic lens is surface treated so as to depress the amount of reflection and to improve the light-transmittance. One specific method for preventing reflection is a method of coating an inorganic oxide or halide by vacuum vapor deposition.

However, in such a reflection preventing film, contaminations due to sweat, dirt from hands, fingerprints, hair dressing, oils, etc. easily adhere to the film and are difficult to remove. Since such a film has a high wettability to water, if water or rain droplets adhere thereto, the water spreads widely across the film surface; thus, the refraction ratio of the optical parts is changed. Moreover, the water penetrates into the film, and elements and ions dissolved in the water cause chemical changes of the film itself which also helps to change the refraction ratio of the optical parts.

Generally, an $SiO_2$ type or $MgF_2$ type film is used as the reflection preventing film at the surface exposed to the air, i.e., the outermost coated layer. In the $SiO_2$ type film, $SiO_2$ reacts with water to form a silanol group, and a water mark due to this reaction is often generated. In the $MgF_2$ type film, $MgF_2$ reacts with water and $Mg(OH)_2$ deposits so as to cause a similar type of a water mark.

Furthermore, since the film surface of a vacuum vapor deposited film does not have good sliding properties, problems arise, e.g., the surface is easily damaged by abrasion.

SUMMARY OF THE INVENTION

An object of the present invention is to provide a reflection preventing film free from the prior art problems and excellent in water resistance, contamination resistance, abrasion resistance, working resistance, etc.

Specifically, an object of the present invention is to provide a surface treating composition and a surface treating method by which the water resistance, contamination resistance, abrasion resistance, working resistance, etc. of a reflection preventing film can be improved.

Other objects and effects of the present invention will be apparent from the following description.

The above objects of the present invention have been attained by a surface treating composition for a reflection preventing film comprising at least one surface treating agent selected from the group consisting of a reactive organic polysiloxane compound containing an amino group and a reactive organic polysiloxane compound containing an epoxy group.

DETAILED DESCRIPTION OF THE INVENTION

Specific non-limiting examples of the reactive organic polysiloxane compound containing an amino group useful as the surface treating agent in the surface treating composition of the present invention include di(aminomethyl)dimethylpolysiloxane, di(aminoethyl)dimethylsiloxane, di(aminopropyl)dimethylpolysiloxane, di(aminobutyl)dimethylpolysiloxane, etc. Among these, di(aminopropyl) dimethylpolysiloxane is preferred.

Specific non-limiting examples of the reactive organic polysiloxane compound containing an epoxy group useful as the surface treating agent in the surface treating composition of the present invention include di(glycidoxymethyl) dimethylpolysiloxane, di(glycidoxyethyl)dimethylpolysiloxane, di(glycidoxypropyl)dimethylpolysiloxane, di(glycidoxybutyl)dimethylpolysiloxane, etc. Among these, di(glycidoxypropyl)dimethylpolysiloxane is preferred.

The method for treating the surface of a reflection preventing film according to the present invention comprises the step of treating a reflection preventing film with a surface treating composition comprising at least one surface treating agent selected from a reactive organic polysiloxane compound containing an amino group and a reactive organic polysiloxane compound containing an epoxy group.

In practicing the method according to the present invention, in order to apply the above surface treating composition uniformly, the surface treating agent is preferably dissolved in an inert organic solvent.

Examples of the inert organic solvent include paraffin type, cycloparaffin type or aromatic hydrocarbons, halogenated hydrocarbons, and ketones. Specific examples thereof include hexane, heptane, cyclohexane, cyclopentane, benzene, toluene, xylene, trichloroethylene, tetrachloroethylene, trichlorotrifluoroethane, tetrachlorodifluoroethane, acetone and methyl ethyl ketone. A mixed solvent consisting of two or more of the above solvents may be used if desired. Among these, toluene, trichlorotrifluoroethane and a mixture thereof are preferred.

The surface treating composition of the present invention must be capable of repelling water and preventing water marks on the surface of a reflection preventing film, and must be applied uniformly to the reflection preventing film. If the concentration of the surface treating agent is less than 0.001 wt% based on the total amount of the surface treating composition, the water repelling property and water mark preventing property are usually insufficient. If the concentration is more than 10 wt% based on the total amount of the surface treating composition, the surface treating agent cannot be applied uniformly, and the interference colors are undesirably changed. Therefore, the concentration of the polysiloxane surface treating agent is preferably from 0.001 to 10.0 wt% based on the total amount of the surface treating composition. More preferably, the concentration of the polysiloxane surface treating agent is from 0.1 to 1.0 wt% based on the total amount of the surface treating composition, but the most preferred concentration depends on the kind of the solvent and the drawing rate upon dip-coating.

A hardening agent selected from an amine, an organic acid and an organic acid anhydride may be present in the surface treating composition of the present invention for crosslinking the organic polysiloxane surface treating agent and also for accelerating such a crosslinking reaction.

Specific examples of suitable amines as the hardening agent include ethylenediamine, ethylenetriamine, diethylaminopropylamine, triethylamine, benzyldimethylamine, dimethylaminophenol and tri(dimethylamino)methylphenol. Specific examples of suitable organic acids and organic acid anhydrides as the hardening agent include citric acid, phthalic anhydride, tetrahydro phthalic anhydride, hexahydro phthalic anhydride, pyromellitic anhydride and trimellitic anhydride. A mixture of two or more of the above hardening agents may be used if desired. Among these, trimethylamine is preferred. The concentration of the hardening agent in the surface treating composition of the present invention is preferably from 0.0001 to 0.5 wt%, more preferably from 0.001 to 0.1 wt%, base on the total amount of the surface treating composition.

The present invention can be applied to any reflection preventing films known in the art. Conventional reflection preventing films are described, e.g., in Kogaku Hakumaku (Optical Thin Films), pages 98 to 110, published on Feb. 25, 1985 by Kyoritsu Shuppan, Japan.

In practicing the method for treating a reflection preventing film, the surface treating composition of the present invention is generally coated on the reflection preventing film so that the dry thickness is from about 5 nm to 3.0 $\mu$m, and preferably from 10 to 50 nm. As a method for coating, any conventional method such as dipping, spraying, spinning-coating, etc. may be employed.

In the present invention, the preferred ambient temperature upon coating the surface treating composition is room temperature, and more preferably from 10° to 20° C. The coated surface treating composition is preferably dried at room temperature for 2 to 24 hours or at from 50° to 80° C., for from 1 to 5 hours.

Excellent performance of the present invention can also be obtained by heat-treating (e.g., at 200° to 250° C.) the thus-coated layer of the treating composition after coating. However, since the surface treating composition of the present invention has a reactivity at a relatively low temperature of from about 10° to 40° C., excellent performance also can be obtained without the heat treatment.

Therefore, the surface treating composition of the present invention can be dried at room temperature and the treatment can be conducted easily. Furthermore, the present invention is particularly advantageous for treating materials which are easily affected by heat such as plastics.

The present invention will be described in more detail referring to the examples, but is not construed as being limited thereto. Unless otherwise indicated, all parts, percents, ratios, etc. are by weight.

EXAMPLE 1

(1) Preparation of Lens to be Surface Treated

After washing a synthetic resin lens made of a diethyleneglycol bisallylcarbonate resin with water, the water was substituted by isopropyl alcohol, and then the lens was dried with Frone vapor. A reflection preventing film was provided on the lens by vacuum vapor deposition. The constitution of the reflection preventing film was $Y_2O_3$ (film thickness: $\lambda/4 = 510$ nm), $Ta_2O_5$ (film thickness: $\lambda/4$) and $SiO_2$ (film thickness: $\lambda/4$) from the lens to the outside in order.

(2) Preparation of Treating Solution 0.2 part of di(glycidoxypropyl)dimethylpolysiloxane was uniformly dissolved in 100 parts of toluene. The solution obtained was purified by filtering to prepare a treating solution.

(3) Coating and Drying

The above prepared treating solution was coated on the above-prepared lens by dip coating at a drawing rate of 150 mm/min, and then dried at room temperature.

EXAMPLE 2

(1) Preparation of Lens to be Surface Treated

After washing a crown glass lens with water, the water was substituted by isopropyl alcohol, and then the lens was dried with Frone vapor. A reflection preventing film consisting of $MgF_2$ (film thickness: $\lambda/4, = 510$ nm) was provided on the lens by vacuum vapor deposition.

(2) Preparation of Treating Solution 0.2 part of di(glycidoxypropyl)dimethylpolysiloxane and 0.002 part of triethylamine were uniformly dissolved in 100 parts of toluene. The solution obtained was purified by filtering to prepare a treating solution.

(3) Coating and Drying

The above-prepared treating solution was coated on the above-prepared lens by dip coating at a drawing rate of 150 mm/min, and dried at room temperature.

EXAMPLE 3

(1) Preparation of Lens to be Surface Treated

A lens was prepared in the same manner as in item (1) of Example 1.

(2) Preparation of Treating Solution 0.2 part of di(glycidoxypropyl)dimethylpolysiloxane and 0.01 part of citric acid were uniformly dissolved in 100 parts of methyl ethyl ketone. The solution obtained was purified by filtering to prepare a treating solution.

(3) Coating and Drying

The above-prepared treating solution was coated on the above-prepared lens by dip coating at a drawing rate of 150 mm/min, and dried at room temperature.

EXAMPLE 4

(1) Preparation of Lens to be Surface Treated

A lens was prepared in the same manner as in item (1) of Example 1.

(2) Preparation of Treating Solution 0.2 part of di(aminopropyl)dimethylpolysiloxane was uniformly dissolved in 100 parts of n-hexane. The solution obtained was purified by filtering to prepare a treating solution.

(3) Coating and Drying

The above-prepared treating solution was coated on the above-prepared lens by dip coating at a drawing rate of 150 mm/min, and dried at room temperature.

EXAMPLE 5

(1) Preparation of Lens to be Surface Treated

A lens was prepared in the same manner as in item (1) of Example 1.

(2) Preparation of Treating Solution 0.6 part of di(aminopropyl)dimethylpolysiloxane was uniformly dissolved in 100 parts of trichlorotrifluoroethane. The solution obtained was purified by filtering to prepare a treating solution.

(3) Coating and Drying

The above-prepared treating solution was coated on the above-prepared lens by dip coating at a drawing rate of 150 mm/min, and dried at 80° C. for 1 hour.

EXAMPLE 6

The same procedures as in Example 1 were repeated except that the treating solution was prepared as follows.

0.1 part of di(aminopropyl)dimethylpolysiloxane and 0.1 part of di(glycidoxypropyl)dimethylpolysiloxane were dissolved in 100 parts of n-hexane. The solution obtained was purified by filtering.

EXAMPLE 7

The same procedures as in Example 1 were repeated except that the treating solution was prepared as follows.

0.1 part of di(aminopropyl)dimethylpolysiloxane, 0.1 part of di(glycidoxypropyl)dimethylpolysiloxane and 0.01 part of citric acid were dissolved in 100 parts of methyl ethyl ketone. The solution obtained was purified by filtering.

EXAMPLE 8

(1) Preparation of lens to be surface treated

A lens was prepared in the same manner as in item (1) of Example 1.

(2) Preparation of Treating Solution 0.002 part of di(aminopropyl)dimethylpolysiloxane was uniformly dissolved in 100 parts of trichlorotrifluoroethane. The solution obtained was purified by filtering to prepare a treating solution.

(3) Coating and Drying

The above-prepared treating solution was coated on the above-prepared lens by dip coating at a drawing rate of 150 mm/min, and dried at room temperature.

EXAMPLE 9

(1) Preparation of Lens to be Surface Treated

A lens was prepared in the same manner as in item (1) of Example 1.

(2) Preparation of Treating Solution 0.01 part of di(glycidoxypropyl)dimethylpolysiloxane was uniformly dissolved in 99 parts of trichlorotrifluoroethane and 1 part of tetrachloroethylene. The solution obtained was purified by filtering to prepare a treating solution.

(3) Coating and Drying

The above-prepared treating solution was coated on the above-prepared lens by dip coating at a drawing rate of 150 mm/min, and dried at room temperature.

EXAMPLE 10

(1) Preparation of Lens to be Surface Treated

After washing a lens made of a crown glass with water, the water was substituted by isopropyl alcohol, and then the lens was dried with Frone vapor. A reflection preventing film made of $MgF_2$ (film thickness: $\lambda/4$, $\lambda = 510$ nm) was provided on the lens by vacuum vapor deposition.

(2) Preparation of Treating Solution 0.001 part of di(aminopropyl)dimethylpolysiloxane was uniformly dissolved in 100 parts of toluene. The solution obtained was purified by filtering to prepare a treating solution.

(3) Coating and Drying

The above-prepared treating solution was coated on the above-prepared lens by dip coating at a drawing rate of 450 mn/min, and then dried at room temperature.

COMPARATIVE EXAMPLE 1

The same procedures as in item (1) of Example 1 were carried out to prepare a lens having a reflection preventing film, but the procedures in items (2) and (3) were not carried out.

COMPARATIVE EXAMPLE 2

The same procedures as in item (1) of Example 2 were carried out to prepare a lens having a reflection preventing film, but the procedures in items (2) and (3) were not carried out.

The lenses prepared in the above Examples 1 to 10 and Comparative Examples 1 and 2 were evaluated as to lens performance in the following manner. The results obtained are shown in Table 1 below.

Water Mark 2 ml of tap water was dropped on the surface of the lens, and allowed to dry at room temperature for 72 hours. The lens surface thus dried was wiped with lens paper, and the residue of water mark was inspected with the naked eye. A lens with no residue of water mark was evaluated as "good", and a lens with residue of water mark was evaluated as "poor".

Surface Smoothness

The lens surface was rubbed with a cloth at a load of 1 kg and a rate of 5 rpm for 5 minutes. The condition of the lens surface was inspected and evaluated as follows.
A: no flaw
B: 1 to 10 of thin flaws
C: 10 or more of thin flaws Solvent Resistance The lens surface was wiped 50 times with lens paper soaked with acetone, and then the presence or absence of water marks was evaluated in the same manner as in the above water mark test to the following grades.

A: same as in the result in the above water mark test without acetone treatment
B: slightly inferior to the result in the above water mark test without acetone treatment
C: poor Appearance The lens was inspected with the naked eye. A lens with no defects as to the coating interference color and surface treatment unevenness was evaluated as "good", and a lens with these defects was evaluated as "poor".

Warm water Resistance

The lens was immersed in warm water at 60° C. for 10 hours, and then the presence or absence water marks was evaluated in the same manner as in the above water mark test to the following grades.
A: same as in the result in the above water mark test without immersion in warm water
B: slightly inferior to the result in the above water mark test without acetone treatment
C: poor

TABLE 1

| | Water mark | Surface smoothness | Solvent resistance | Appearance | Warm water resistance |
|---|---|---|---|---|---|
| Example 1 | good | A | A | good | A |
| Example 2 | good | A | A | good | A |
| Example 3 | good | A | A | good | A |
| Example 4 | good | A | B | good | A |
| Example 5 | good | A | A | good | A |
| Example 6 | good | A | A | good | A |
| Example 7 | good | A | A | good | A |
| Example 8 | good | A | A | good | A |
| Example 9 | good | A | A | good | A |
| Example 10 | good | A | A | good | A |
| Comparative Example 1 | poor | C | C | good | C |
| Comparative Example 2 | poor | C | C | good | C |

As is clear from Table 1, the lenses treated according to the present invention are excellent in all properties tested.

According to the present invention, the following particular effects are attained: (1) if water or rain droplets adhere to the lens and dry thereon, water marks can be removed easily; (2) contamination due to fingerprints, dirt from hands, etc. is less likely to adhere to the reflection preventing film, and if adhered, the contamination is not conspicuous; (3) since the sliding property of the lens surface is excellent, flaws are difficult to impart; (4) the appearance is quite good; and (5) water marks are not generated if the lens is immersed in warm water.

Furthermore, because the surface treating composition of the present invention has a reactivity even at a relatively low temperature (10° to 40° C.), the coating of the surface treating composition can be dried at room temperature, and thus the handling process is easy.

Therefore, the present invention is particularly advantageous for treating optical materials which are easily affected by heat such as plastics.

While the invention has been described in detail and with reference to specific examples thereof, it will be apparent to one skilled in the art that various changes and modifications can be made therein without departing from the spirit and scope thereof.

What is claimed is:

1. A lens comprising a base material having thereon a reflection preventing inorganic film, and further having on the reflection preventing inorganic film a film isolating the reflection preventing inorganic film from the outer atmosphere which is formed from a surface treating composition for the reflection preventing film which comprises at least one surface treating agent selected from the group consisting of a reactive organic polysiloxane compound containing a reactive amino group and a reactive organic polysiloxane compound containing a reactive epoxy group, wherein said reactive amino group and said reactive epoxy group are reactive with said reflection preventing film, and said reactive organic polysiloxane compound containing an amino group is selected from the group consisting of di(aminomethyl)dimethylpolysiloxane, di(aminoethyl)-dimethylpoly-siloxane, di(aminopropyl)dimethylpolysiloxane and di(aminobutyl)dimethylpolysiloxane and wherein said reactive organic polysiloxane compound containing an epoxy group is selected from the group consisting of di(glycidoxymethyl)dimethylpolysiloxane, di(glycidoxyethyl) dimethylopolysiloxane, di(glycidoxypropyl)dimethylpolysiloxane and di(-glycidoxybutyl)dimethylpolysiloxane.

2. A lens as claimed in claim 1, wherein the base material comprises a resin or glass.

3. A lens as claimed in claim 1, wherein the inorganic film comprises $MgF_2$ or $SiO_2$.

4. A lens as claimed in claim 1, wherein the film isolating the inorganic film from the outer atmosphere functions to prevent the formation of a water mark on the inorganic film.

5. A lens as claimed in claim 1, wherein said surface treating composition further comprises an inert organic solvent in which said surface treating agent is dissolved.

6. A lens as claimed in claim 1, wherein said surface treating agent is said reactive organic polysiloxane compound containing a reactive epoxy group and said surface treating composition further comprises a hardening agent for said reactive organic polysiloxane compound containing a reactive epoxy group selected from the group consisting of an amine, an organic acid, and an organic acid anhydride.

7. A lens as claimed in claim 1, wherein said surface treating agent is present in a concentration of from 0.001 to 10. 0 wt% based on the total amount of said surface treating composition.

* * * * *